(12) United States Patent
Yadlowsky et al.

(10) Patent No.: US 12,539,166 B2
(45) Date of Patent: Feb. 3, 2026

(54) ELECTROSURGICAL SMOKE EVACUATION FOR SURGICAL PROCEDURES

(71) Applicant: Intuitive Surgical Operations, Inc., Sunnyvale, CA (US)

(72) Inventors: Ann Yadlowsky, Sunnyvale, CA (US); Mathew P. Nussbaum, Campbell, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 723 days.

(21) Appl. No.: 17/788,234

(22) PCT Filed: Dec. 18, 2020

(86) PCT No.: PCT/US2020/066154
§ 371 (c)(1),
(2) Date: Jun. 22, 2022

(87) PCT Pub. No.: WO2021/133688
PCT Pub. Date: Jul. 1, 2021

(65) Prior Publication Data
US 2023/0329778 A1 Oct. 19, 2023

Related U.S. Application Data

(60) Provisional application No. 62/953,079, filed on Dec. 23, 2019.

(51) Int. Cl.
*A61B 18/14* (2006.01)
*A61M 13/00* (2006.01)
*A61B 18/00* (2006.01)

(52) U.S. Cl.
CPC ......... *A61B 18/1482* (2013.01); *A61M 13/00* (2013.01); *A61B 2018/00779* (2013.01);
(Continued)

(58) Field of Classification Search
CPC . A61B 18/1206; A61B 18/14; A61B 18/1482; A61B 2018/00642;
(Continued)

(56) References Cited

U.S. PATENT DOCUMENTS 6,203,590 B1 3/2001 Byrd et al.
2018/0296268 A1* 10/2018 Bhawalkar ......... B01D 46/0047
(Continued)

FOREIGN PATENT DOCUMENTS

CN 101069651 A 11/2007
CN 103690237 A 4/2014
(Continued)

OTHER PUBLICATIONS

International Preliminary Report on Patentability for Application No. PCT/US2020/066154, mailed on Jul. 7, 2022, 10 pages.
(Continued)

*Primary Examiner* — Tigist S Demie
(74) *Attorney, Agent, or Firm* — Schwegman, Lundberg & Woessner, P.A.

(57) ABSTRACT

Various examples of the disclosed subject matter include systems and methods to control a flowrate of a smoke evacuation system. In one example, a smoke-evacuation system includes an electrosurgical a unit (ESU) to provide electrical power to an electrosurgical tool within a surgical site. A monitoring device measures one or more electrical parameters from the electrosurgical tool and a controller estimates an amount of generated smoke within the surgical site based on the electrical parameters. The controller sets a flowrate of a suction device to remove gases within the surgical site. The flowrate of the removed gases produced is based on the estimated amount of generated smoke. The controller further controls a flowrate of an insufflation gas produced by an insufflation device where the flowrate of the
(Continued)

insufflation gas is substantially equal to the flowrate of the gases produced by the suction device. Other systems and methods are disclosed.

20 Claims, 5 Drawing Sheets

(52) U.S. Cl.
CPC ............ *A61B 2018/00875* (2013.01); *A61B 2218/008* (2013.01)

(58) Field of Classification Search
CPC ........... A61B 2018/00648; A61B 2018/00779; A61B 2018/00827; A61B 2018/00875; A61B 2218/008; A61M 13/00; A61M 13/003; A61M 16/026; A61M 2202/0225; A61M 2205/054; A61M 2205/3334; A61M 2205/3341; A61M 2205/3569; A61M 2205/3592; A61M 2205/502; A61M 2205/75; A61M 2205/7545; A61M 2230/65; A61K 31/4196; A61K 45/06
See application file for complete search history.

(56) References Cited

U.S. PATENT DOCUMENTS

| | | |
|---|---|---|
| 2019/0099213 A1 | 4/2019 | Witt et al. |
| 2019/0159825 A1* | 5/2019 | Frampton .......... A61B 18/1402 |
| 2019/0159830 A1 | 5/2019 | Horner et al. |
| 2019/0182421 A1 | 6/2019 | Piponi |
| 2019/0201082 A1 | 7/2019 | Shelton, IV et al. |
| 2019/0201086 A1* | 7/2019 | Shelton, IV ... A61B 17/320068 |
| 2019/0201113 A1 | 7/2019 | Shelton, IV et al. |
| 2019/0201593 A1 | 7/2019 | Shelton, IV et al. |
| 2019/0269863 A1 | 9/2019 | Cosmescu |

FOREIGN PATENT DOCUMENTS

| | | |
|---|---|---|
| CN | 106456235 A | 2/2017 |
| CN | 110338910 A | 10/2019 |

OTHER PUBLICATIONS

International Search Report and Written Opinion for Application No. PCT/US2020/066154, mailed Apr. 1, 2021, 14 pages.

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

ELECTROSURGICAL SMOKE EVACUATION FOR SURGICAL PROCEDURES

CLAIM OF PRIORITY

This application is a U.S. National Stage Filing under 35 U.S.C. 371 from International Application No. PCT/US2020/066154, filed on Dec. 18, 2020, and published as WO 2021/133688 A1 on Jul. 1, 2021, which claims the priority benefit to U.S. Patent Application Ser. No. 62/953,079, filed on 23 Dec. 2019, and entitled "ELECTROSURGICAL SMOKE EVACUATION FOR SURGICAL PROCEDURES," each of which is incorporated by reference herein in its entirety.

TECHNOLOGY FIELD

The disclosed subject matter is generally related to the field of minimally-invasive surgery. More specifically, the disclosed subject matter is related to estimating an anticipated amount of electrosurgical-induced smoke and steam (or similar) within a surgical site and evacuation of the smoke from the surgical site.

BACKGROUND

Surgical procedures can be performed in a minimally invasive manner using a teleoperated surgical system (e.g., a teleoperated robotic system). The benefits of a minimally invasive surgery are well known and include less patient trauma, less blood loss, and faster recovery times when compared with traditional, open-incision surgery. In addition, the use of robotic surgical systems (e.g., teleoperated robotic systems that provide telepresence), such as the da Vinci® Surgical System (commercialized by Intuitive Surgical, Inc., Sunnyvale, California USA), is known. Such robotic surgical systems allow a surgeon to operate with intuitive control and increased precision compared to alternative minimally invasive surgical methods.

In one aspect of a minimally invasive surgical system, surgery is performed by a surgeon controlling a robot. The robot includes one or more instruments that are coupled to robotic arms. The instruments access a surgical site through small incisions in the skin of a patient. A cannula is inserted into each incision and a shaft of the instrument can be inserted through the cannula to access the surgical site.

Surgical smoke evacuators are configured to evacuate smoke (including generated particulate matter and water vapor or steam) and as well as fluids (e.g., gases) from a surgical site. For example, during a surgical procedure involving an energy-generating device, smoke can be generated at or within the surgical site. Smoke and steam generated by electrosurgery in minimally invasive surgery prevents the surgeon from having a clear view of the surgical field. The active insufflator device pressurizes and distends the working volume and allows gas at or near the surgical site to be exchanged, via a suction device, to remove the smoke and steam. Another common way to minimize a loss of visualization involves a surgeon requesting a patient-side assistant to suck smoke out with a suction-irrigator.

As is used in some prior art systems, a continuous, high-flow suction-irrigation is not desirable because the suction can reduce insufflation pressure and/or increase an amount of insufflation gas exchange required, potentially resulting in excessive gas circulation (e.g., via continuous suction) which may overly dry out surrounding tissues. The overly dry tissues can lead to tissue damage and pain to the patient. In other prior art systems that use a flow of gas (e.g., $CO_2$) as an insufflation mechanism, the gas flowrate is manually adjusted as needed to maintain adequate working volume and/or good visualization.

In a typical case with a standalone electrosurgical unit (ESU) and active insufflator, the insufflator does not have knowledge of actual power delivery to the tissue. That is, the insufflator operates as an open-loop system and continues to supply a constant flowrate of gas regardless of the amount of smoke or steam that is actually produced within the body cavity.

Other prior art devices attempted to improve upon manually controlled insufflation devices by sensing when an electrosurgical procedure is activated (when the electrosurgery at the surgical site begins) and use the activation information to turn on a smoke-evacuation function of a separate smoke-evacuation device. However, while synchronizing the smoke evacuation to activation of the electrosurgical procedure is an improvement, prior art systems have failed to consider refining control algorithms within the insufflation device to increase gas flowrates only during those periods when electrosurgical procedures that result in the creation of smoke and steam is most likely.

The information described in this section is provided to offer a person of ordinary skill in the art a context for the following disclosed subject matter and should not be considered as admitted prior art.

SUMMARY

In various embodiments, the disclosed subject matter includes a surgical insufflation and smoke-evacuation system, comprising an electrosurgical unit (ESU) having a power-generation unit to provide electrical power to an electrosurgical tool; a power-monitoring device coupled to the ESU to measure at least one parameter from the electrosurgical tool; a controller coupled to the ESU to estimate an amount of generated smoke based on one or more of the parameters related to the surgical procedure; an insufflation device coupled to and controlled by the controller to deliver an insufflation gas during the surgical procedure, a flowrate of the insufflation device being based on the estimated amount of generated smoke; and a suction device coupled to the controller to remove one or more gases within a volume proximate the surgical procedure.

In various embodiments, the disclosed subject matter includes a surgical insufflation and smoke-evacuation system, comprising a controller coupled to an electrosurgical unit (ESU) to estimate an amount of generated smoke based one or more parameters related to a surgical procedure, the one or more parameters comprising at least one parameter comprising an electrical impedance of a target site of the energy application such as, for example, human tissue (as well as other types of mammalian and other tissue types) during the surgical procedure, electrical power delivered to an electrosurgical tool substantially during a time period when the surgical procedure is being performed, and electrical current delivered to the electrosurgical tool substantially during a time period when the surgical procedure is being performed; an insufflation device coupled to the controller to deliver an insufflation gas during the surgical procedure, a flowrate of the insufflation device being based on the one or more parameters; and a suction device coupled to the controller to control a flowrate of one or more gases within a suction tube during the surgical procedure.

In various embodiments, the disclosed subject matter includes a method of performing insufflation and smoke-evacuation from a surgical site during a surgical procedure. The method comprises making a determination of an estimated amount of smoke present within a volume proximate to a surgical site; and setting an insufflator device flowrate based on the estimated amount of smoke.

DETAILED DESCRIPTION

Electrosurgery involves the use of electricity to generate heat within biological tissue to cause thermal tissue effects resulting in sealing or in incision and removal of the tissue through one or more of desiccation, coagulation, or vaporization, for example. Electrosurgery typically involves using radio frequency (RF) alternating current (AC) that creates heat by resistive heating as the current passes through the tissue. An insufflator instrument provides an enlarged volume within a body cavity proximate to a location where the electrosurgery is being performed.

In general, an insufflator instrument introduces a flow of gas into the body cavity. In various exemplary embodiments disclosed herein, the insufflator instrument provides, for example, carbon dioxide ($CO_2$) or other gas to within the body cavity in which the electrosurgery is being performed. The $CO_2$ gas is used to pressurize and distend the working volume and allow gases proximate to the surgical site to be exchanged to remove smoke and steam, both of which may be generated by the electrosurgical process. A person of ordinary skill in the art will recognize that although various embodiments disclosed herein refer to carbon dioxide or $CO_2$ gas, the disclosed subject matter is not limited to only providing $CO_2$ gas and other gases may be substituted. One goal of the disclosed subject matter is to reduce or minimize the total flow of carbon dioxide while removing smoke and steam that can obscure the visual field. The skilled artisan will further recognize that the terms "smoke" and "steam," as used herein, can also refer to any type of visual obscuration gas or particulates, or other contaminants or byproducts, formed by an electrosurgical process.

During a typical electrosurgical procedure, a surgeon encounters a variety of tissue types and compositions, each of which have varying degrees of hydration levels and electrical impedance values. Typically, well-vascularized tissues have lower electrical impedances. If little or no hydration (moisture) is left in the tissue, the impedance of the tissue is much higher. The effect of applying sufficient radio-frequency (RF) energy to well-vascularized tissues is that, for example, the water content is evaporated during cutting and/or coagulation applications (e.g., prior to tissue vaporization wherein fluid content may be converted to a gas). This situation results in the creation of smoke and steam. Since the generator setting and/or tissue impedance can affect the electrosurgical current and power that is delivered to the tissue, it is possible to use at least some of these electrical parameters (e.g., impedance, power, and electrical current) to make a determination of when visualization within a surgical volume may be obscured or reduced.

In the typical case of a standalone electrosurgical unit (ESU) and an active insufflator, the insufflator is not given feedback of actual power delivery to the tissue and therefore operates as an open-loop system as described above. The disclosed subject matter is applicable to an integrated system such as the da Vinci® surgical robot or other minimally invasive surgical system with a configuration that includes communication either between the ESU and the insufflator or between each unit and a control system that can send commands based on information regarding a current status, parameters, and settings of each unit.

Specifically, the disclosed subject matter uses parameters including, for example, the electrical impedance, electrical power, and electrical current delivered to the tissue by the electrosurgical generator to estimate an amount of smoke and steam being generated and adjust the flowrate of the insufflator accordingly. Using at least one of the aforementioned-parameters from the ESU such as impedance, power, and current controls both activation of the insufflator and a magnitude of the flowrate of the gas produced by the insufflator, while still enabling a balance between influent (e.g., the gas supplied by the insufflator) and effluent (the smoke evacuation or suction) components. The insufflation system can therefore remove smoke, fluids (e.g., gases and steam), and particulates from a surgical site without excessively drying out tissue due to too high of flowrate of the gas. The flowrate of the insufflator is then increased or decreased as needed to eliminate generated smoke and steam at or near the surgical volume. The calculations for the smoke estimation, flowrate, and setting adjustment can be performed in the ESU, in the insufflator, or in some other component of the system. Calculations and estimations of the amount of smoke and steam generated may optionally be stored in lookup tables, produced through algorithms, and/or stored in, for example, tabular or relational databases. Thus, the various embodiments of the system provide a reduced or minimum flow necessary to remove the smoke and steam that may be obscuring the visual field.

As described in detail below, various embodiments of an electrosurgical smoke-evacuation system (also referred to herein as a surgical smoke-evacuation system) may optionally also include an adjustable flow setting allowing the surgeon to adjust the sensitivity of the system related to a flowrate produced by the insufflator. For surgical cases that are especially susceptible to the effects of excessive flow, the surgeon would set the flow control to a low setting to prevent the control system from making large increases to the flow. For cases with a greater need for good visualization that are less sensitive to higher gas flowrates, a higher flow setting could be used. In the second case, the result would be good visualization with higher flow than the first case but not excessive flow for the visualization needs. As noted, high flowrates may dry out tissue too quickly or excessively.

Therefore, the disclosed subject matter uses a parameter of the impedance, power, and/or current delivered to the tissue by the electrosurgical generator to estimate an amount of smoke and steam being generated and adjust the flowrate of the insufflator. Consequently, the system can provide a minimum flowrate to remove the generated smoke and steam that can obscure the visual field. As used herein, the term flowrate can be considered as either volumetric flowrate or mass flowrate as is understood by the skilled artisan.

Figure 1:
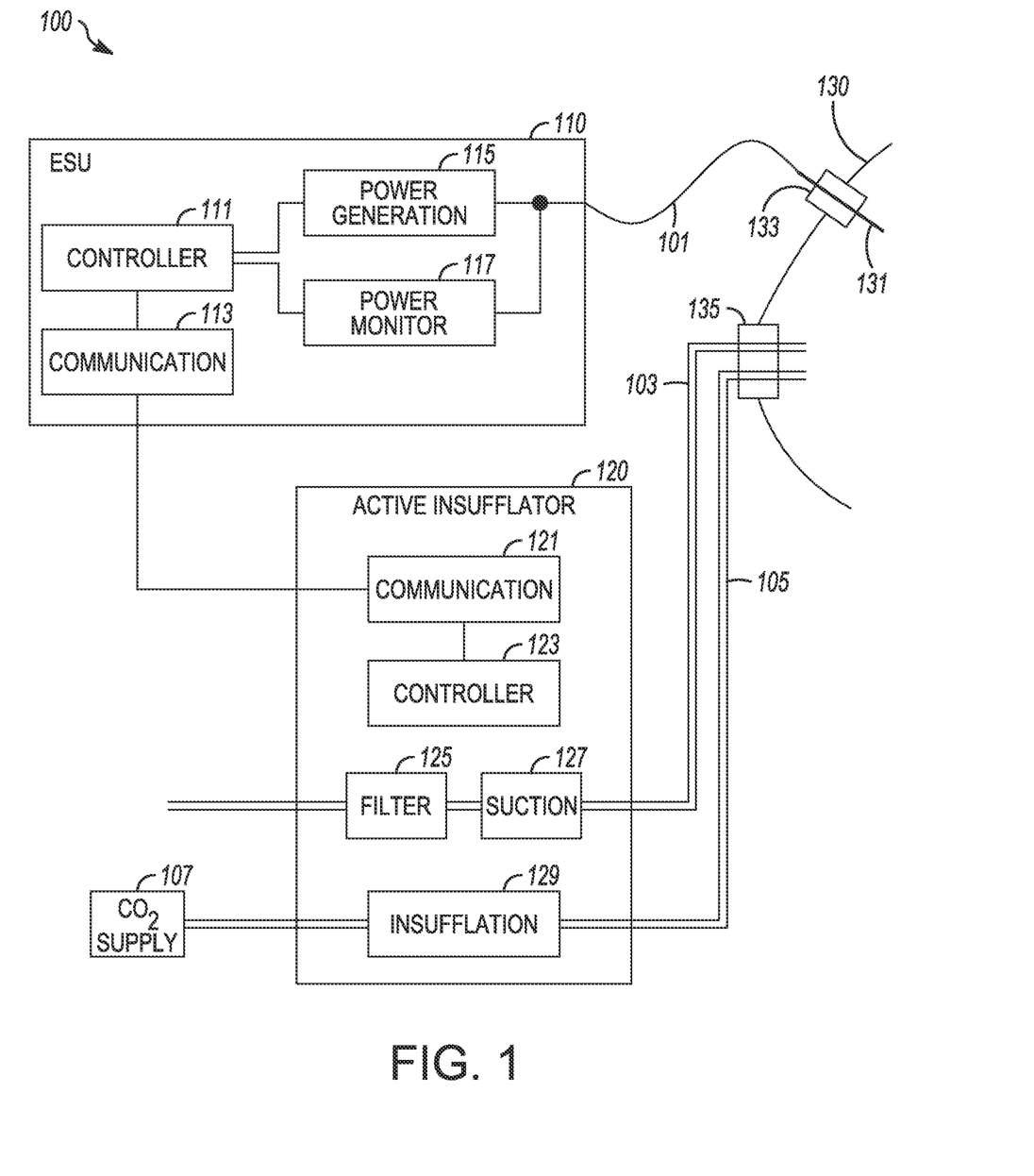
FIG. 1 shows an exemplary embodiment of an electrosurgical smoke-evacuation system that is in accordance with the disclosed subject matter.

With reference now to FIG. 1, an exemplary embodiment of an electrosurgical smoke-evacuation system 100 in accordance with the disclosed subject matter is shown. FIG. 1 is shown to include an electrosurgical unit (ESU) 110 and an active insufflator unit 120. The ESU 110 includes an ESU controller 111, an ESU communication device 113, a power-generation device 115, and a power-monitoring device 117. The active insufflator unit 120 includes an insufflator communication device 121, an insufflator controller 123, a filter 125, a suction device 127, and an insufflation device 129.

FIG. 1 is also shown to include an example of a minimally-invasive surgical site 130 (e.g., an abdomen of a mammalian body). An electrosurgical handpiece wire 101 is coupled to an electrosurgical tool 131. The electrosurgical tool 131 enters the minimally invasive surgical site 130 through a cannula 133, known in the art. Power is delivered to the electrosurgical tool 131 from the power-generation device 115 through the electrosurgical handpiece wire 101. Power variables output by the power-generation device 115 (e.g., frequency of signal, amplitude of signal, and an amount of electrical current supplied to the signal) from the power-generation device 115 are monitored by the power-monitoring device 117. Further, an impedance of tissues proximate to the volume undergoing the surgical procedure can be measured by the power-monitoring device 117 by signals received from the electrosurgical tool 131. In some embodiments, the power-monitoring device 117 may comprise, for example, an analog or digital display indicating a single value of power (the amplitude and the amount of current, supplied to the signal), one or more of the power variables, or other information related to power output from the power-generation device 115 and displayed for the convenience of the surgeon. In other embodiments, only one of the aforementioned parameters may optionally be displayed, for example, the amount of power delivered.

The ESU controller 111 may be operated automatically or manually by the surgeon. In various embodiments, in either automatic operation or manual operation, the ESU controller 111 provides a desired (or calculated) input level of, for example, the power variables discussed above, to the power-generation device 115. The power-monitoring device 117 may optionally display the power output variables as discussed and may optionally also display a quantity of power variables input of the power-generation device 115 that are received from the ESU controller 111. All power output variables from the ESU controller 111 are transferred from the ESU communication device 113 to the insufflator communication device 121. The insufflator controller 123 can control parameters of both suction from the suction device 127 and a flowrate of $CO_2$ delivered to the minimally-invasive surgical site 130 through the insufflation device 129. The filter 125 removes most or all particulates, effluents, and other fluids or solid materials (e.g., fluid contaminants and solid contaminants) removed from the 130 by the suction device 127 prior to the contaminants being released to the environment. In various embodiments, the filter 125, or an output from the filter 125, may optionally also be directed through, for example, a water reservoir component to remove or reduce an amount of generated carcinogenic material.

With continuing reference to FIG. 1, suction tubing 103 and insufflation tubing 105 enter the minimally-invasive surgical site 130 through a second cannula 135. Gas is supplied by the $CO_2$ supply 107 for the insufflation device 129. The insufflation device 129 may comprise a pump (e.g., a peristaltic pump) or similar device known in the art. The insufflation device 129 is controlled to supply a flow of gas measured by, for example, a volumetric flow meter or a mass flow meter (not shown but known in the art). The flowrate control of the insufflation device 129 may be accomplished by, for example, electrical control or pneumatic control provided as an input to the insufflation device 129 from the insufflator controller 123. The insufflator controller 123 also provides an input signal to the suction device 127 such that the suction device 127 and the insufflation device 129 are balanced. That is, either a pressure of a flowrate of gases and other fluids or particulate matter extracted from the minimally-invasive surgical site 130 by the suction device 127 is about equal to or slightly less than (e.g., about equal to or about 10 percent less than) the pressure, created by the flowrate of gas, supplied by the insufflation device 129 into the minimally-invasive surgical site 130. Consequently, the suction device 127 will not evacuate so much gas so as to collapse the minimally-invasive surgical site 130 that was insufflated by the insufflation device 129 (and further, for example, take into consideration fluctuations in insufflation pressure). In embodiments, fluctuations in insufflation pressure are substantially avoided. Therefore, a substantially equivalent pressure is maintained such that a stability in pressure exists between the insufflation and the suction devices. In these embodiments, a flowrate of gas supplied by the insufflator is monitored (at least up to a maximum flowrate of gas that may be generated by the insufflation device) to compensate for a rate of gas lost due to the suction device.

Moreover, the suction device 127 is arranged to evacuate a sufficient level of gas, fluids (e.g., vapor or steam), and particulate matter to provide a sufficiently viewable volume proximate to the surgical site. In various embodiments, a flowrate sufficient to provide the viewable volume is based on pre-determined parameters as described above. The pre-determined parameters can include, for example, an estimated amount of steam and particulate matter generated for an input value of frequency, amplitude, and electrical current supplied to the electrosurgical tool 131. This evacuation process is described in more detail with reference to FIG. 3, below.

In some embodiments, the ESU controller 111 can contain all lookup tables, algorithms, and/or databases discussed above that are used to provide information to operate the electrosurgical smoke-evacuation system 100. In other embodiments, the lookup tables and/or databases can be contained within one or in both of the other controllers 111, 123. Such lookup tables and/or databases may be stored on various types of hardware, firmware, and/or software devices or media known in the art and described in more detail below.

In various embodiments, the electrosurgical smoke-evacuation system 100 can include a sensitivity control allowing the surgeon to adjust the sensitivity of the system related to a flowrate produced by the insufflator. The sensitivity control may be located on, for example, the ESU controller 111, on the insufflator controller 123, or on a central control system (e.g., a surgeon console, not shown but readily understandable to a skilled artisan) for a robotic system if used (also not shown). In some embodiments, the sensitivity control may optionally be replicated on both controllers 111, 123 for the convenience of the surgeon. For example, for surgical cases especially susceptible to effects of excessive flow, the surgeon can set the sensitivity control to a low setting to prevent the electrosurgical smoke-evacuation system 100 from making too large of increases in one or both flowrates (e.g., from one or both of the suction device 127 and the insufflation device 129). For cases with a greater need for good visualization that are less sensitive to a higher flow, a higher sensitivity control setting may be used by the surgeon. In the latter case, the result is good visualization with higher flowrates than the first case, but not excessive flowrates for the visualization needs.

A parameter related to at least one of the impedance, power, and/or electrical current delivered to tissue in the surgical site is measured by the power-monitoring device 117 based on electrical feedback delivered to or obtained from the electrosurgical tool 131. The parameter is passed to one or both of the other controllers 111, 123. One or both of the other controllers 111, 123 use the parameter to estimate an amount of smoke and steam being generated based on information saved into the storage areas or calculated from algorithms as described above. An optimum or desired flowrate is based on this estimate, coupled with the surgeon sensitivity setting, described above. One or both of the other controllers 111, 123 sends a command signal to or within the active insufflator unit 120 to set the flowrates to the suction device 127 and the insufflation device 129 to this optimum or desired flowrate value.

Figure 2:
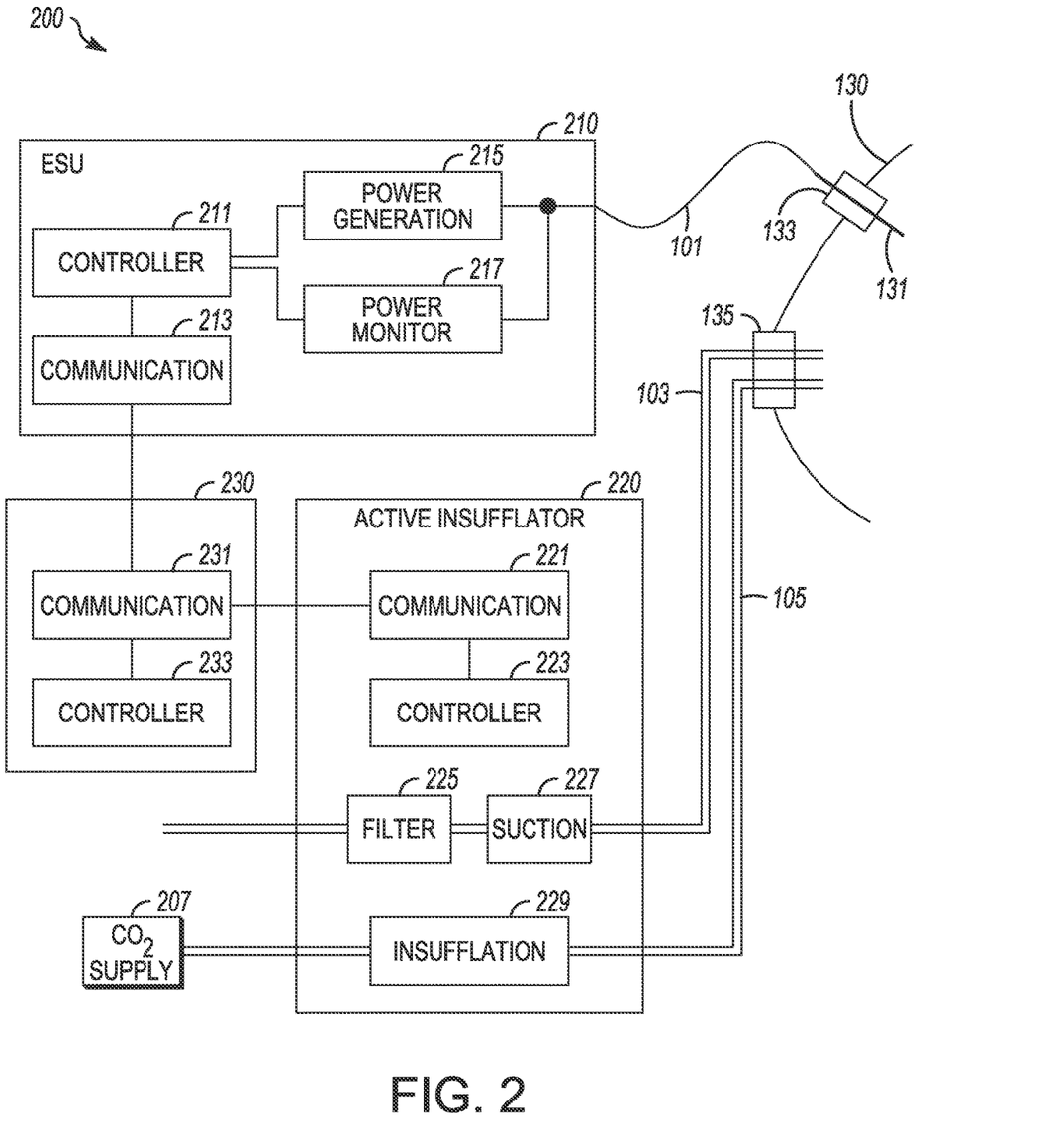
FIG. 2 shows another exemplary embodiment of an electrosurgical smoke-evacuation system having a central control unit that is in accordance with the disclosed subject matter.

With reference to FIG. 2, another exemplary embodiment of an electrosurgical smoke-evacuation system 200 having a central control unit 230 that is in accordance with the disclosed subject matter is shown. FIG. 2 is shown to include an electrosurgical unit (ESU) 210 and an active insufflator unit 220. The ESU 210 includes an ESU controller 211, an ESU communication device 213, a power-generation device 215, and a power-monitor device 217. The active insufflator unit 220 includes an insufflator communication device 221, an insufflator controller 223, a filter 225, a suction device 227, and an insufflation device 229. Gas is supplied by the $CO_2$ supply 207 for the insufflation device 229. Each of these components are the same as or similar to components shown and described above with reference to FIG. 1.

FIG. 2 is also shown to include a central control unit 230. The central control unit 230 includes a central communication device 231 and a central controller 233. As shown in FIG. 2, the central communication device 231 intervenes between all communications shared between the ESU 210 and the active insufflator unit 220. Further, all control of the electrosurgical smoke-evacuation system 200 can be centralized within the central controller 233. In this embodiment, the central controller 233 can provide commands to the ESU controller 211 and the insufflator controller 223. The commands are transferred through the central communication device 231 and exchange information with or direct information to the ESU communication device 213 and the insufflator communication device 221, respectively. Although all communications within the electrosurgical smoke-evacuation system 200 appears in FIG. 2 to be through hardwired signal paths, no such limitation is intended. For example, the communications may be through wireless signals such as RF radio signals using protocols such as Bluetooth® or other wireless communication protocols known in the art. Further, communications may take place through wireless signals having a hardwired signal path backup to maintain high safety levels.

In some embodiments, the central control unit 230 can also contain all lookup tables, algorithms, and/or databases discussed above that are used to provide information to the central controller 233 to operate the electrosurgical smoke-evacuation system 200. In other embodiments, the lookup tables, algorithms, and/or databases can be contained within one or in all of the controllers 211, 223, 233. Such lookup tables and/or databases may be stored on various types of hardware, firmware, and/or software devices or media known in the art and described in more detail below.

As described above with reference to FIG. 1, the electrosurgical smoke-evacuation system 200 may optionally include a sensitivity control (not shown explicitly), adjustable by the surgeon. The sensitivity control may be located on either the ESU 210 or the active insufflator unit 220. The sensitivity control can also be located on the central control unit 230 instead of or in addition to locating the sensitivity control on the ESU 210 and/or the active insufflator unit 220.

In a similar fashion to the procedure disclosed above with reference to FIG. 1, one or more parameters related to at least one of the impedance, power, and/or electrical current delivered to tissue in the surgical site is measured by the power-monitor device 217 based on electrical feedback delivered to or obtained from the electrosurgical tool 131. The one or more parameters are passed to the central control unit 230. The central control unit 230 uses the one or more parameters to estimate an amount of smoke and steam being generated based on information saved into the storage areas or calculated from algorithms as described above. The central control unit 230 then calculates an optimum or desired flowrate based on this estimate, coupled with the surgeon sensitivity setting, described above. The central control unit 230 sends a command signal through the communication devices 231, 221 to the active insufflator unit 220 to set the flowrates to the suction device 227 and the insufflation device 229 to this optimum or desired flowrate value.

Figure 3:
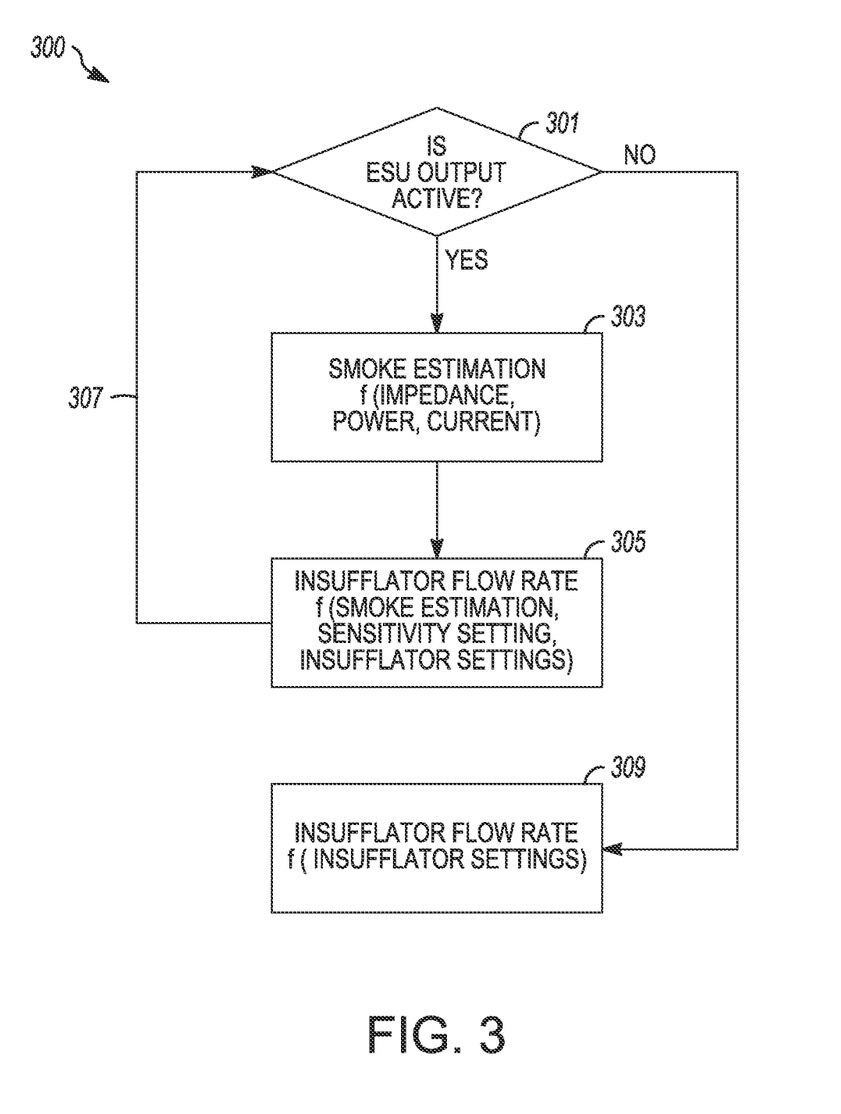
FIG. 3 shows an example of s simplified flow chart for estimating an amount of smoke and steam generation and a resulting insufflator flowrate to remove at least a portion of the generated smoke and steam.

FIG. 3 shows an example of a simplified flow chart 300 for estimating an amount of smoke and steam generation and a resulting insufflator flowrate to remove at least a portion of the generated smoke and steam. At operation 301, a determination is made as to whether an ESU (e.g., the ESU 110 of FIG. 1) output is active (e.g., whether the electrosurgical unit is activated and in use). If the ESU output is not active, the flow chart 300 continues to operation 309 where the insufflator flowrate (e.g., the insufflation device 129) may be set to zero or simply a function of default insufflator settings (e.g., an insufflation pressure of about 15 mm Hg at a flowrate of about 20 SLPM). In some embodiments, a latency period is also included whereby the insufflator flowrate is not immediately reduced to zero. For example, if the plume buildup (e.g., residual smoke accumulation) from a high energy application cannot be evacuated immediately upon cessation of the supplying of RF energy, then running a smoke evacuation process for some pre-determined time period longer may be used to alleviate the plume buildup.

At operation 301, if the ESU output is active, the flow chart 300 proceeds to operation 303 where a smoke and/or steam estimation is made based on a function of at least one electrical parameter including impedance, power, and current. At operation 305, the insufflator flowrate is set, based as a function of smoke and steam estimation, a sensitivity control setting input by the surgeon, and insufflator settings (e.g., such as a level of electrical signal required for the insufflator to produce the optimized or desired flowrate). After operation 305 is completed, the flow chart 300 again loops back at 307 to operation 301 to verify whether the ESU is still active. In some embodiments, a time period for determining when the flow chart 300 should loop back at 307 to operation 301 can be determined based on how quickly any of the parameters described above may be expected to change. In other embodiments, the time period may be fixed based on a given procedure. Upon reading and understanding the disclosed subject matter, a person of ordinary skill in the art will recognize how this time period (e.g., duration), fixed or variable, may be determined.

Each of the operations of the simplified flow chart 300 may be performed by one or more of the controllers (e.g., the central controller 233 of FIG. 2 or one of the other controllers 211, 223 of FIG. 2).

In various embodiments, the disclosed subject matter could also apply to the case of a smoke evacuator that is separate from the insufflator. In this embodiment, the smoke evacuator would adjust the flowrate of the suction based on the algorithm described above either in the ESU, smoke evacuator, or central control system.

Figure 4:
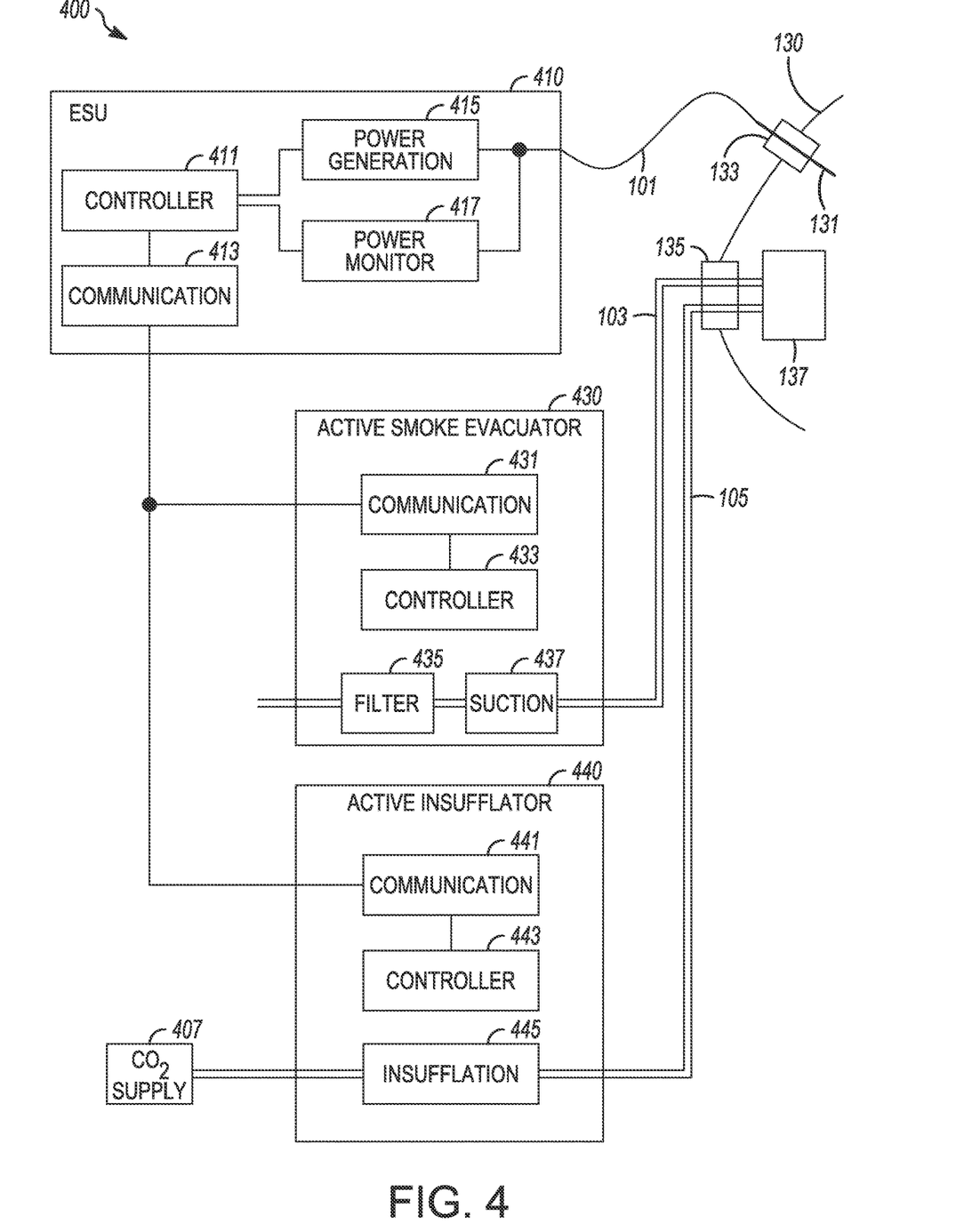
FIG. 4 shows an exemplary embodiment of an electrosurgical smoke-evacuation system having an active smoke-evacuator in accordance with the disclosed subject matter.

For example, FIG. 4 shows another exemplary embodiment of an electrosurgical smoke-evacuation system 400 having a separate smoke-evacuator unit 430 that is in accordance with the disclosed subject matter is shown. FIG. 4 is also shown to include an electrosurgical unit (ESU) 410 and an active insufflator unit 440. The ESU 410 includes an ESU controller 411, an ESU communication device 413, a power-generation device 415, and a power-monitor device 417. The separate smoke-evacuator unit 430 includes a smoke-evacuator communication device 431, a smoke-evacuator controller 433, a smoke-evacuator filter 435, and a smoke-evacuator suction device 437. The active insufflator unit 440 includes an insufflator communication device 441, an insufflator controller 443, and an insufflation device 445. Gas is supplied by the $CO_2$ supply 407 for the insufflation device 445. Other than the separate smoke-evacuator unit 430 being a separate device, each of these components is the same as or similar to components shown and described above with reference to FIG. 1. Further, each of the components operates similarly or identically to similar devices of FIG. 1.

For example, in some embodiments, any one or all of the controllers 411, 433, 443 can contain all lookup tables, algorithms, and/or databases discussed above that are used to provide information to the smoke-evacuator suction device 437 and the insufflation device 445 to operate the electrosurgical smoke-evacuation system 400. Also, to further enhance safety of the electrosurgical smoke-evacuation system 400, all control parameters may optionally be replicated on each of the controllers 411, 433, 443. Should one controller fail, one or both of the remaining controllers may control operations of the electrosurgical smoke-evacuation system 400. For example, should the insufflator controller 443 fail, the ESU controller 411 or the smoke-evacuator controller 433 can take over all operations of the active insufflator unit 440 through various ones of the communications devices 413, 431, 441. Additionally, should two of the controllers fail, the sole remaining controller may take over control of all aspects of the electrosurgical smoke-evacuation system 400. Therefore, much like the electrosurgical smoke-evacuation system 200 of FIG. 2, the electrosurgical smoke-evacuation system 400 of FIG. 4 can be considered to have a triply-redundant control system.

Further, the sensitivity control (not shown explicitly) described above can also be located in the smoke-evacuator unit 430 instead of or in addition to locating the sensitivity control on the ESU 410 and/or the active insufflator unit 440.

In a similar fashion to the procedure disclosed above with reference to FIG. 1, a parameter related to at least one of the impedance, power, and/or electrical current delivered to tissue in the surgical site is measured by the ESU 410 based on electrical feedback obtained from the electrosurgical tool 131. The parameter is passed to at least one of the controllers, as noted above. For example, the insufflator controller 443 uses the parameter to estimate an amount of smoke and steam being generated based on information saved into the storage area or calculated as described above. The insufflator controller 443 then calculates an optimum or desired flowrate based on this estimate, coupled with the surgeon sensitivity setting, described above. The insufflator controller 443 then sends a signal to set the flowrates to the smoke-evacuator suction device 437 and the insufflation device 445 to this optimum or desired flowrate value.

Figure 5:
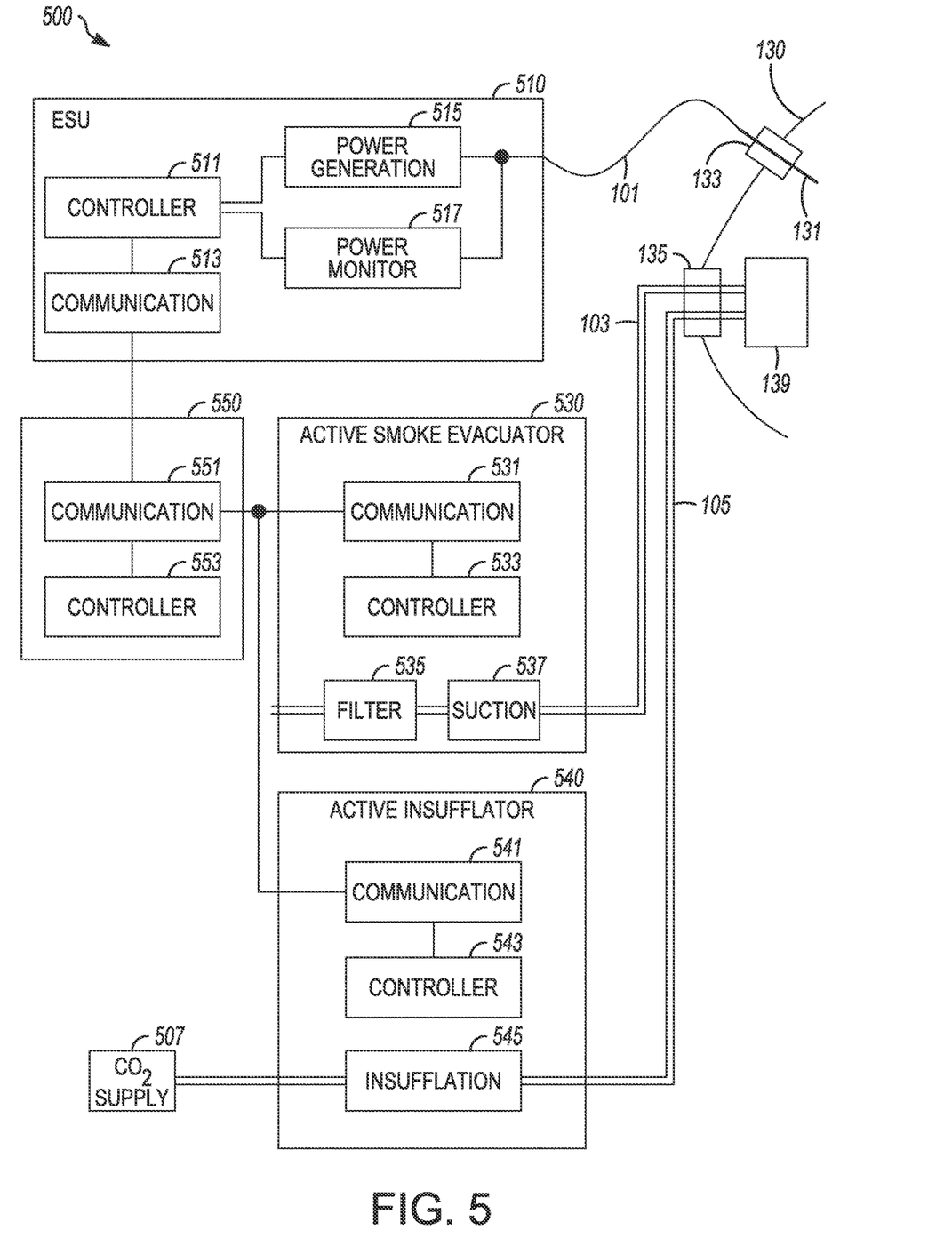
FIG. 5 shows another exemplary embodiment of an electrosurgical smoke-evacuation system having an active smoke-evacuator and a central control unit that is in accordance with the disclosed subject matter.

FIG. 5 shows another exemplary embodiment of an electrosurgical smoke-evacuation system 500 having an active smoke-evacuator unit 530 and a central control unit 550 that is in accordance with the disclosed subject matter. FIG. 5 is also shown to include an electrosurgical unit (ESU) 510 and an active insufflator unit 540. The ESU 510 includes an ESU controller 511, an ESU communication device 513, a power-generation device 515, and a power-monitoring device 517. The separate active smoke-evacuator unit 530 includes a smoke-evacuator communication device 531, a smoke-evacuator controller 533, a smoke-evacuator filter 535, and a smoke-evacuator suction device 537. The active insufflator unit 540 includes an insufflator communication device 541, an insufflator controller 543, and an insufflation device 545. Gas is supplied by the $CO_2$ supply 507 for the insufflation device 545.

FIG. 5 is also shown to include a central control unit 550. The central control unit 550 includes a central communication device 551 and a central controller 553. As shown in FIG. 5, the central communication device 551 intervenes between all communications shared between one or all of the ESU 510, the active smoke-evacuator unit 530, and the active insufflator unit 540. Further, all control of the electrosurgical smoke-evacuation system 500 can be centralized within the central controller 553. In this embodiment, the central controller 553 can provide commands to the ESU controller 511, the smoke-evacuator controller 533, and the insufflator controller 543. The commands are transferred through the central communication device 551 and exchange information with or direct information to the ESU communication device 513, the smoke-evacuator communication device 531, and the insufflator communication device 541, respectively. As with FIGS. 1, 2, and 4, although all communications within the electrosurgical smoke-evacuation system 500 appears in FIG. 5 to be through hardwired signal paths, no such limitation is intended. For example, the communications may be through wireless signals such as RF radio signals using protocols such as Bluetooth® or other wireless communications protocols known in the art. Further, communications may take place through wireless signals having a hardwired signal path backup to maintain high safety levels.

In some embodiments, the central control unit 550 can also contain all lookup tables, algorithms, and/or databases discussed above that are used to provide information to the central controller 553 to operate the electrosurgical smoke-evacuation system 500. In other embodiments, the lookup tables, algorithms, and/or databases can be contained within one or all of the controllers 511, 533, 543, 553. Such lookup tables and/or databases may optionally be stored on various types of hardware, firmware, and/or software devices or media known in the art and described in more detail below.

In a similar fashion to the procedure disclosed above with reference to FIG. 1, a parameter related to at least one of the impedance, power, and/or electrical current delivered to tissue in the surgical site is measured by the ESU 510 based on electrical feedback obtained from the electrosurgical tool 131. The parameter is passed to the central control unit 550. The central control unit 550 uses the parameter to estimate an amount of smoke and steam being generated based on information saved into the storage are described above. The central control unit 550 then calculates an optimum or desired flowrate based on this estimate, coupled with the surgeon sensitivity setting, described above. The central control unit 550 sends a command signal through, for example, the communication devices 531, 543 to the suction device 537 and the insufflation device 545 to this optimum or desired flowrate value.

Other than the central control unit 550 being a separate device, each of these components is the same as or similar to components shown and described above with reference to FIG. 4.

EXAMPLES OF EMBODIMENTS OF THE DISCLOSED SUBJECT MATTER

In a first embodiment, the disclosed subject matter includes a surgical insufflation and smoke-evacuation system, comprising an electrosurgical unit (ESU) having a power-generation unit to provide electrical power to an electrosurgical tool; a power-monitoring device coupled to the ESU to measure at least one parameter from the electrosurgical tool; a controller coupled to the ESU to estimate an amount of generated smoke based on one or more of the parameters related to the surgical procedure; an insufflation device coupled to and controlled by the controller to deliver an insufflation gas during the surgical procedure, a flowrate of the insufflation device being based on the estimated amount of generated smoke; and a suction device coupled to the controller to remove one or more gases within a volume proximate the surgical procedure.

In a second embodiment, the disclosed subject matter also includes the surgical insufflation and smoke-evacuation system of the first embodiment, wherein the at least one parameter is selected from parameters of an electrical impedance of a target site of the energy application (e.g., human or other tissue) during the surgical procedure, electrical power delivered to an electrosurgical tool substantially during a time period when the surgical procedure is being performed, and electrical current delivered to the electrosurgical tool substantially during a time period when the surgical procedure is being performed.

In a third embodiment, the disclosed subject matter also includes the surgical insufflation and smoke-evacuation system of any one of the preceding embodiments, and further comprises a manually-adjustable sensitivity control, settable by a surgeon during the surgical procedure, to increase or decrease the flowrate of the insufflation device.

In a fourth embodiment, the disclosed subject matter also includes the surgical insufflation and smoke-evacuation system of any one of the preceding embodiments, wherein the power-monitoring device measures an impedance of tissues proximate to the volume undergoing the surgical procedure by signals received from the electrosurgical tool.

In a fifth embodiment, the disclosed subject matter also includes the surgical insufflation and smoke-evacuation system of any one of the preceding embodiments, and further comprises a filter coupled downstream from the suction device to remove particulates from effluents received from the suction device.

In a sixth embodiment, the disclosed subject matter includes a surgical insufflation and smoke-evacuation system, comprising a controller coupled to an electrosurgical unit (ESU) to estimate an amount of generated smoke based on one or more parameters related to a surgical procedure, the one or more parameters comprising at least one parameter comprising an electrical impedance of a target site of the energy application (e.g., human or other tissue) during the surgical procedure, electrical power delivered to an electrosurgical tool substantially during a time period when the surgical procedure is being performed, and electrical current delivered to the electrosurgical tool substantially during a time period when the surgical procedure is being performed; an insufflation device coupled to the controller to deliver an insufflation gas during the surgical procedure, a flowrate of the insufflation device being based on the one or more parameters; and a suction device coupled to the controller to control a flowrate of one or more gases within a suction tube during the surgical procedure.

In a seventh embodiment, the disclosed subject matter also includes the surgical insufflation and smoke-evacuation system of the sixth embodiment, wherein a sensitivity of the insufflation device is adjustable manually by a surgeon based on a level of generated-smoke obscuration of a visual field within a surgical volume.

In an eighth embodiment, the disclosed subject matter also includes the surgical insufflation and smoke-evacuation system of either one of the sixth or the seventh embodiments, wherein the suction control device is adjusted automatically based on a signal received from the ESU by the suction-control device.

In a ninth embodiment, the disclosed subject matter also includes the surgical insufflation and smoke-evacuation system of any one of the sixth through the eighth embodiments, and further comprises a power-monitoring device coupled to the ESU to measure the one or more parameters.

In a tenth embodiment, the disclosed subject matter also includes the surgical insufflation and smoke-evacuation system of the ninth embodiment, wherein the power-monitoring device measures an impedance of tissues proximate to the volume undergoing the surgical procedure by signals received from the electrosurgical tool.

In an eleventh embodiment, the disclosed subject matter also includes the surgical insufflation and smoke-evacuation system of any one of the sixth through the tenth embodiments, and further comprises a filter coupled downstream from the suction device to at least partially remove particulates and effluents received from the suction device.

In a twelfth embodiment, the disclosed subject matter also includes the surgical insufflation and smoke-evacuation system of any one of the sixth through the eleventh embodiments, and further comprises a water reservoir component coupled downstream from the suction device to at least partially remove generated carcinogenic material.

In a thirteenth embodiment, the disclosed subject matter also includes the surgical insufflation and smoke-evacuation system of any one of the sixth through the twelfth embodiments, and further comprises a manually-adjustable sensitivity control, settable by a surgeon during the surgical procedure, to increase or decrease the flowrate of the insufflation device.

In a fourteenth embodiment, the disclosed subject matter also includes the surgical insufflation and smoke-evacuation system of any one of the sixth through the thirteenth embodiments, wherein the smoke includes steam.

In a fifteenth embodiment, the disclosed subject matter includes a method of performing insufflation and smoke-evacuation from a surgical site during a surgical procedure. The method comprises making a determination of an estimated amount of smoke present within a volume proximate to a surgical site; and setting an insufflator device flowrate based on the estimated amount of smoke.

In a sixteenth embodiment, the disclosed subject matter also includes the method of the sixteenth embodiment, wherein the estimated amount of smoke is based on at least one parameter selected from parameters of a measured electrical impedance of a target site of the energy application (e.g., human or other tissue) during the surgical procedure, electrical power delivered to an electrosurgical tool substantially during a time period when the surgical procedure is being performed, and electrical current, delivered to the electrosurgical tool substantially during a time period when the surgical procedure is being performed.

In a seventeenth embodiment, the disclosed subject matter also includes the method of either one of the fifteenth and sixteenth embodiments, and further comprises setting a flowrate of a suction device, coupled to suction tubes within the surgical site, to be at, for example, about equal to or about 10% less than the flowrate of the insufflator device.

In an eighteenth embodiment, the disclosed subject matter also includes the method of any one of the fifteenth through the seventeenth embodiments, and further comprises filtering particulates and effluents received from an output of the suction device.

In a nineteenth embodiment, the disclosed subject matter also includes the method of the eighteenth embodiment, and further comprises transporting effluents received from an output of the suction device through a water reservoir component to at least partially remove generated carcinogenic material.

In a twentieth embodiment, the disclosed subject matter also includes the method of any one of the fifteenth through the nineteenth embodiments, and further comprises adjusting the flowrate of the insufflator device based on a manually-adjustable sensitivity control.

Such systems and methods as described above may be run on various types of devices as described below in more detail. The devices include, for example, a computer or microprocessor, a special-purpose processor, such as a field programmable gate array (FPGA) or an application-specific integrated circuit (ASIC) that is programmed, in software, firmware, or as a hardware implementation, with one or more aspects of the disclosed subject matter described above.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, devices, or units. Any one of these components, devices, or units may constitute either software modules (e.g., code embodied on a machine-readable medium or in a transmission signal) or hardware modules. A "hardware module" is a tangible unit capable of performing certain operations (e.g., a pump) and may be configured or arranged in a certain physical manner. In various embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, pneumatically, or in any suitable combination thereof. For example, a hardware module may include dedicated circuitry or logic that is permanently configured to perform certain operations. For example, a hardware module may be a special-purpose processor, such as an FPGA or an ASIC.

A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, whether physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware-module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

The performance of certain of the operations may be distributed among the one or more processors, not only residing within a single machine, but deployed across a number of machines. In some embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other embodiments of the electrosurgical smoke-evacuation systems discussed herein. For example, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment or set of embodiments.

What is claimed is:

1. A surgical smoke-evacuation system, comprising:
    an electrosurgical unit (ESU) having a power-generation unit to provide electrical power to an electrosurgical tool;
    a monitoring device coupled to the ESU to measure electrical impedance of a target site of an application of the RF energy during the surgical procedure;
    a controller coupled to the ESU; and
    a suction device coupled to and controlled by the controller to remove one or more gases within a volume proximate the surgical procedure,
    wherein the controller estimates an amount of generated smoke based on the measured electrical impedance and controls the suction device to produce a flowrate of gas based on the estimated amount of generated smoke.

2. The surgical smoke-evacuation system of claim 1, further comprising an insufflation device coupled to and controlled by the controller to deliver an insufflation gas during the surgical procedure, wherein the controller controls the insufflation device to produce a flowrate of gas that is substantially equal to the flowrate of gas produced by the suction device.

3. The surgical smoke-evacuation system of claim 2, further comprising a manually-adjustable sensitivity control, settable by a surgeon during the surgical procedure, to increase or decrease the flowrate of the insufflation device.

4. The surgical smoke-evacuation system of claim 1, wherein the monitoring device measures the electrical impedance of the target site of the application of the RF energy proximate to the volume undergoing the surgical procedure by signals received from the electrosurgical tool.

5. The surgical smoke-evacuation system of claim 1, further comprising a filter coupled downstream from the suction device to remove particulates from effluents received from the suction device.

6. The surgical smoke-evacuation system of claim 1, wherein the monitoring device is contained within the ESU.

7. A surgical smoke-evacuation system, comprising:
    a controller coupled to an electrosurgical unit (ESU); and
    a suction device coupled to and controlled by the controller to remove one or more gases within a volume proximate the surgical procedure,
    wherein the controller estimates an amount of generated smoke based on an electrical impedance of an energy application site during the surgical procedure and controls the suction device to produce a flowrate of the one or more gases based on the estimated amount of generated smoke.

8. The surgical smoke-evacuation system of claim 7, further comprising an insufflation device coupled to and controlled by the controller to deliver an insufflation gas during the surgical procedure, wherein the controller controls the insufflation device to produce a flowrate of the insufflation gas that is substantially equal to the flowrate of the one or more gases produced by the suction device.

9. The surgical smoke-evacuation system of claim 8, wherein a sensitivity of at least one of the suction device and the insufflation device is further adjustable manually by a surgeon based on a level of generated-smoke obscuration of a visual field within the volume proximate the surgical procedure.

10. The surgical smoke-evacuation system of claim 7, further comprising a monitoring device coupled to the ESU to measure the electrical impedance of the energy application site during the surgical procedure.

11. The surgical smoke-evacuation system of claim 10, wherein the monitoring device is contained within the ESU.

12. The surgical smoke-evacuation system of claim 10, wherein the monitoring device measures the electrical impedance of the energy application site during the surgical procedure in the volume proximate the surgical procedure by signals received from the electrosurgical tool.

13. The surgical smoke-evacuation system of claim 7, further comprising a filter coupled downstream from the suction device to at least partially remove particulates and effluents received from the suction device.

14. The surgical smoke-evacuation system of claim 7, further comprising a water reservoir component coupled downstream from the suction device to at least partially remove generated carcinogenic material.

15. The surgical smoke-evacuation system of claim 7, wherein the suction device is adjusted automatically based on a signal received from the ESU.

16. A method of performing a smoke-evacuation process from a surgical site during a surgical procedure, the method comprising:

making a determination of an estimated amount of smoke present within a volume proximate to a surgical site; and setting a flowrate of a suction device based on the estimated amount of smoke, wherein the estimated amount of smoke is based on a measured electrical impedance of a target site of an energy application during the surgical procedure.

17. The method of claim 16, further comprising setting a flowrate of the suction device, coupled to suction tubes within the surgical site, to be at about equal to or about 10 percent less than the flowrate of an insufflator device.

18. The method of claim 16, further comprising adjusting the flowrate of the suction device based on a manually-adjustable sensitivity control.

19. The method of claim 16, further comprising including a latency period wherein the smoke-evacuation process is continued for a pre-determined period of time after radio-frequency energy used in the surgical procedure is deactivated.

20. The method of claim 19, wherein the latency period is selected from a fixed duration and a variable duration based upon at least one measured electrical parameter and a measured activation time.

* * * * *